Nov. 30, 1954     C. R. JAMISON     2,695,685
ELECTROHYDRAULIC THEFT PREVENTING DEVICE
Filed Dec. 20, 1949
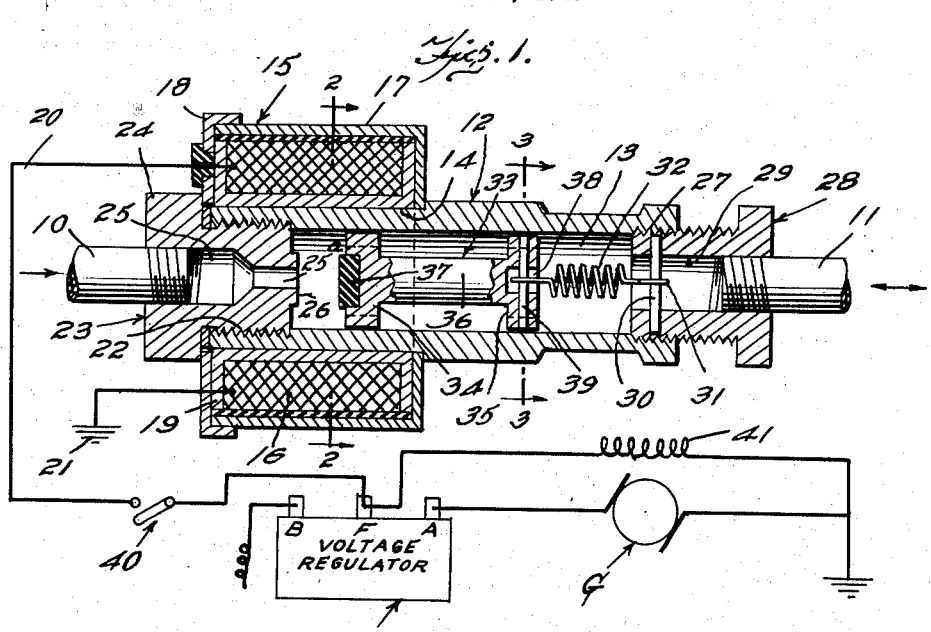
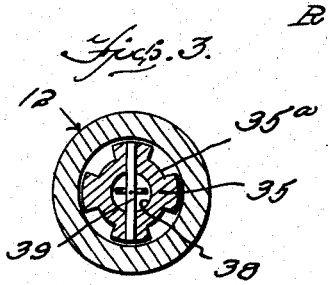
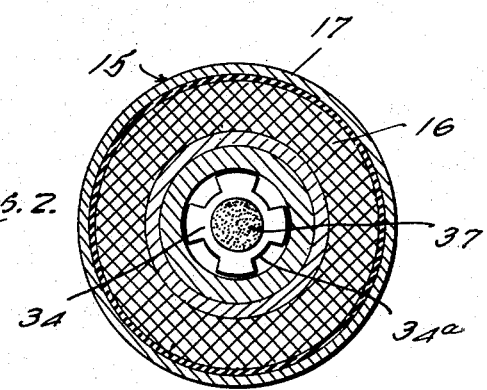
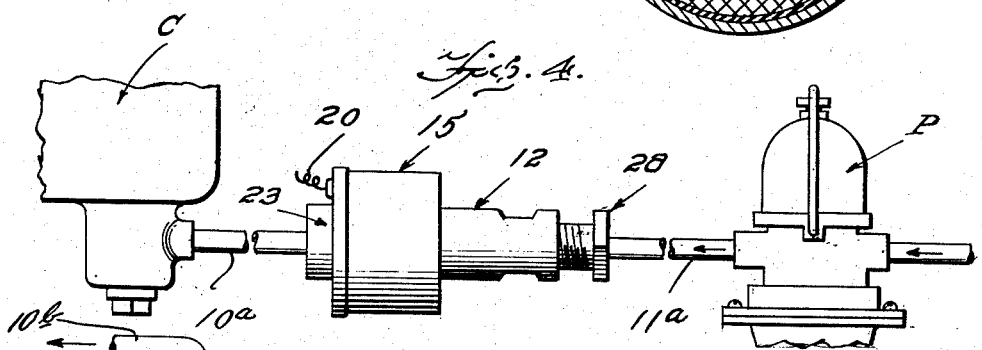
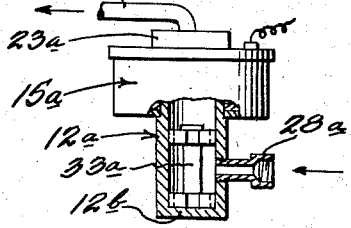
INVENTOR.
Charles R. Jamison
BY
Wilfred J. Lawson
ATTORNEY

United States Patent Office 2,695,685
Patented Nov. 30, 1954

2,695,685

ELECTROHYDRAULIC THEFT PREVENTING DEVICE

Charles R. Jamison, Morgantown, W. Va.

Application December 20, 1949, Serial No. 134,111

1 Claim. (Cl. 188—152)

This invention relates to theft preventing devices for use particularly upon motor vehicles, and it is a particular object of this invention to provide a device for this purpose which, when prepared for functioning, is initially activated by the starting of the vehicle motor and is then maintained active by fluid under pressure in a fluid line in which the device is installed.

Another object of the present invention is to provide a motor vehicle theft preventing device which is designed for installation in a fluid brake line between the master cylinder and the brakes, or in the gasoline line between the fuel pump and the carburetor, and has a valve actuating electro-magnet which is coupled with a current generator whereby upon the starting of the vehicle engine current will become instantly available to actuate the electro-magnet to close the valve and subsequent actuation of the fluid brake pedal or the functioning of the fuel pump will build up pressure against the valve to maintain the latter closed even though the current may be shut off by the stopping of the engine, such action resulting, in a fluid brake line installation, to hold the brakes applied, and in a gasoline line installation, to shut off the flow of fuel to the carburetor until the valve is opened by means known only to the car-owner or operator.

Another object of the invention is to provide an electrohydraulic motor vehicle theft preventing device of the character stated, which is of small, and simple construction whereby it can be easily inserted in a fluid brake or a gasoline line and be relatively inconspicuous, and which is at the same time sturdy and reliable in operation.

Other objects and advantages of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a view in longitudinal section of an electrohydraulic theft preventing device constructed in accordance with the present invention and showing the electrical connections between the generator and the electro-magnet.

Figure 2 is a transverse section on an enlarged scale, on the line 2—2 of Figure 1.

Figure 3 is a transverse section on an enlarged scale, on the line 3—3 of Figure 1.

Figure 4 is a view showing the connection of the device between a fuel pump and a carburetor, all parts being in elevation.

Figure 5 is a view partly in elevation and partly in longitudinal section, of a modified form of the invention, designed particularly for use in the gasoline line.

The device of the present invention is designed, when used in a motor vehicle, to be placed either in the fluid line of a fluid brake system or in the gasoline line.

In describing the device its connections will first be set forth as in a fluid brake system where it would be installed between the master cylinder and the brakes.

In Figure 1 there is shown an end of a pipe 10 which leads from the master cylinder (not shown) of a fluid brake system, while the pipe 11 leads to the distribution pipes for the several brakes (not shown).

In accordance with the present invention there is provided a metal cylinder 12 of suitable length, the bore 13 of which provides a cylinder chamber for the hereinafter described piston valve.

At one end of the cylinder, hereinafter, for convenience of description and without intending in any way to limit the invention, referred to as the head end, an external reduction in diameter is made as indicated at 14, upon which reduced portion is slidably installed an electro-magnetic unit generally designated 15.

This unit 15 may be of any suitable form and construction and is here shown as comprising the customary coil or windings 16 (conventionally illustrated), within a metal casing 17, closed at one end by a cap 18, the coil being upon a spool 19.

The inside diameter of the spool is of proper size to snugly slidably receive the reduced part 14 of the cylinder.

The coil has an end 20 leading from the casing while the other end is grounded to the casing, such ground here being designated 21.

The head end of the cylinder is internally screw threaded as indicated at 22 to threadably receive the inner end of a coupling nipple and valve seat member, generally designated 23.

The outer end of the member 23 is enlarged to provide a head 24, which engages the outer face of the casing cap 18, through which the said inner end of the member extends, thus securing the magnet on the cylinder as shown.

The nipple member has therethrough the axial bore 25, in the outer or head end of which the pipe 10 is threaded.

The inner end of the bore 25 is reduced in diameter as indicated at 25a and extends through a circular boss upon the inner end of the member 24, which forms a valve seat 26.

The end of the cylinder remote from the magnet is also internally screw threaded as indicated at 27 to receive a threaded end of a coupling nipple 28, through which is the bore 29.

The outer end of the nipple 28 has threaded therein the end of the pipe 11.

Across the bore 29 of the nipple 28 is fixed, at the inner end thereof, a pin 30 to which is attached an end 31 of a pull spring 32, the function of which is hereinafter set forth.

Reciprocably disposed within the cylinder bore 13 is a valve piston unit which is generally designated 33 and which is formed of soft iron to function as a movable core for the electro-magnet.

The unit 33 comprises the head and tail discs 34 and 35 respectively connected by the stem 36.

These discs are of a diameter to fit fairly snugly in the bore 13 but at the same time be capable of free sliding movement therein.

Each of the discs 34 and 35 has cut across its periphery a number of recesses 34a and 35a respectively through which fluid may pass from one side, or end, of the valve unit to the other, under certain conditions of operation of the device.

In the forward face, or head face, of the disc 34, is fixed a valve seal or button 37, which may be made of neoprene rubber or any other suitable material, and which is designed to position on the seat 26 to close the bore 25, when the device goes into operation.

The opposite, or rear, end of the unit 33, has a pocket 38 formed centrally in the face of the disc 35, and across this pocket extends a pin 39. The other, or forward, end of the spring 32 extends into the pocket 38 and is attached to the pin 39, as shown.

The spring 32 normally holds the piston valve unit 33, retracted from the nipple member 23, so that the valve seal 37 is off of the seat 26, and, also, the forward disc 34 only is part way within the central or core portion of the magnet coil.

When the magnet coil has electric current passed therethrough, it is energized, the unit 33 is drawn forwardly against the resistance of the spring 32 and the seal 37 is firmly pressed upon the seat 26.

When the device is installed in a fluid brake line as shown, and described, the terminal 20 of the magnet is connected, through a suitable switch 40 with the field terminal F of the voltage regulator R. This terminal is connected in the current generator system with the field coil 41 of the generator G. The regulator R and the generator connections shown, are standard hook-up in motor vehicle electrical systems and do not require further description.

The switch 40 may be of any character to be set or closed manually when the car, in which the theft preventer device is installed, is left by the operator and is to be secreted in some place not readily found by a car thief.

In operation, when the car motor is started by an unauthorized person, the switch 40 being closed, the electromagnet coil will be energized at once upon the starting of the generator. This will pull the piston valve forwardly against the tension of the spring 32, to close the small end 25a of the bore 25, which will be kept closed so long as the motor continues to run. The car can, of course, be started and run until it becomes necessary for the thief to apply the brakes. When the brakes are applied sufficient pressure will be applied to the valve seal or button 37 to unseat it sufficiently for the fluid to be forced through to the car brakes. Thus the brake fluid will be put under high pressure between the theft preventer device and the car brakes and when the pressure is relieved slightly in the pipe 10, or is held steady, the energized magnet coil will pull the unit 33 back to its former position, to close the bore 25. The fluid under pressure will thus be trapped between the pressure surfaces of the unit 33 and the brakes, preventing the brakes from being released.

The thief cannot then again start the vehicle and even though the motor may be stopped, thus deenergizing the coil, the trapped fluid will hold the unit 33 seated.

The areas of the faces of the discs 34 and 35 which are exposed to the pressure of the fluid equals the cross sectional area of the stem 36 so that sufficient pressure is impressed, in the proper direction, on the unit to hold it tightly seated against the pulling action of the spring.

When the owner of the car wishes to start it after the theft preventer has functioned as described, he can release the locked brakes by applying pressure against the unit 33, by depressing the brake pedal, until such applied pressure equals the opposing pressure against the rearward sides of the discs 34 and 35 whereupon the spring may become effective to pull the unit away from the seat 26. If the switch 40 is then opened, or it may have been previously opened, the engine can be started without affecting the coil and valve unit, and be operated as usual.

With the hook-up of the theft preventer device in the gasoline line between the fuel pump P and the carburetor C, as shown in Figure 4, its operation is the same as just described. However, as will be readily apparent the vehicle may be run for a short distance and it may be stopped and started but this can continue only as long as the gasoline supply in the curburetor float chamber holds out. As soon as the engine is started the energized coil 16 will pull the piston valve unit 33 to the seat 26 and the fuel pump will then build up pressure against the unit which will hold the unit tightly seated to close off the pipe line 10a leading to the carburetor.

When the engine has stopped for lack of fuel and the switch opened, no fuel can be got through to the carburetor until the nipple 23 is backed out to such an extent that the pressure in the pipe 11a and the valve unit chamber 13 is reduced to the point where the spring 32 is able to retract the unit.

Figure 5 illustrates a modified form of the invention, for use in the gasoline line, designed to eliminate the spring 32, shown in the first form.

In this modified structure the electro-magnet unit is the same as in the first form and is designated 15a.

The cylinder 12a has the magnet removably held on one end by the coupling nipple 23a, with which is connected the pipe 10b, leading to the carburetor.

The cylinder is modified by having the end remote from the magnet, closed by the wall 12b, and the pipe line (not shown) which leads from the fuel pump is connected to the cylinder, by the nipple 28a, which is threaded in the side wall of the cylinder, as shown.

This modified embodiment of the valve is mounted for use with the cylinder upright and the valve piston unit 33a, normally is positioned with one end disc 35 resting upon the end wall 12b, the other disc 34 being located above the inlet end of the nipple 28a.

With this construction the valve piston unit 33a will tend always to move downwardly in the cylinder or away from the fluid outlet nipple 23a, as it does in the first embodiment under the action of the spring 32, and the line pressure from the fuel pump will tend to hold the valve off of its seat.

From the foregoing it will be seen that there has been provided by the present invention a novel theft preventing device which may be made of small size to be conveniently installed in either of the locations stated and which will function efficiently to accomplish the desired objects. The device is also relatively simple in construction and may therefore be economically manufactured and sold.

I claim:

In a theft preventing device for connection in the fluid pressure conduit of the hydraulic brake system of an automobile having an electric generator, a tubular member, nipples threaded inwardly of the ends of said member for the coupling of adjacent ends of the conduit to the member, the nipple through which the fluid passes to the member and the brake system has its inner end inwardly thickened to provide a restricted passage therethrough, a bossed valve seat formed on the inner end of the one nipple about said restricted passage, an elongated valve element within said member and having circular enlargements at each of its ends, said enlargements having their peripheries notched for the passage of the fluid about the same, the face of the enlargement opposed to said valve seat being centrally recessed, a compressible disk seated in said recess, a pin extending diametrically across the passage through the other of said nipples, a contractile spring interposed between said pin and the opposed end of said valve element and acting to hold the latter positioned for the free flow of the fluid through the member and the nipples, an electro-magnetic coil mounted on said member in encircling relation with respect to the opposed end portions of said one nipple and of the valve element, and a secreted switch connected in circuit with said coil and the electric current generator of the automobile to control the energizing and de-energizing of said coil, said valve element being in open position when the brakes are applied to bring the automobile to a stop, said coil, when energized by the closing of said switch, acting to close said valve element on said valve seat to trap the fluid and thereby maintain the brakes applied until the switch is again opened by the authorized operator of the automobile.

References Cited in the file of this patent

UNITED STATES PATENTS

| Number | Name | Date |
|---|---|---|
| 1,674,914 | Murray | June 26, 1928 |
| 2,217,141 | Sprenkle | Oct. 8, 1940 |
| 2,279,243 | Parsons | Apr. 7, 1942 |
| 2,289,563 | Wood et al. | July 14, 1942 |
| 2,329,156 | Coffey | Sept. 7, 1943 |
| 2,489,929 | Raybould | Nov. 29, 1949 |
| 2,502,118 | Ashton et al. | Mar. 28, 1950 |